May 18, 1948.    J. M. TYRNER    2,441,652
WELDING GENERATOR
Filed June 12, 1946    2 Sheets-Sheet 1

INVENTOR
Joseph M. Tyrner
BY
ATTORNEYS

May 18, 1948.  J. M. TYRNER  2,441,652
WELDING GENERATOR
Filed June 12, 1946  2 Sheets-Sheet 2
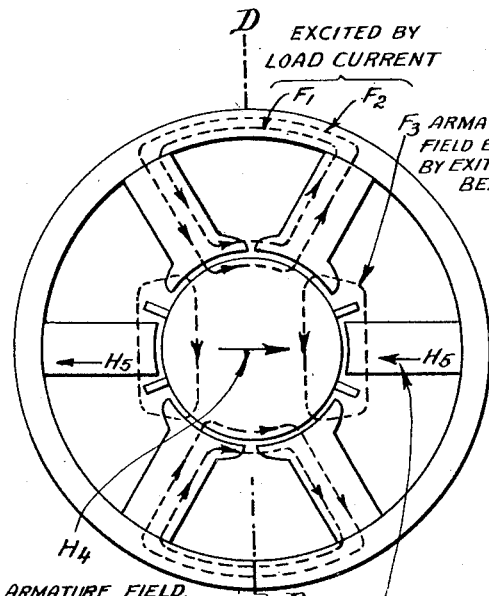
Fig. 3,
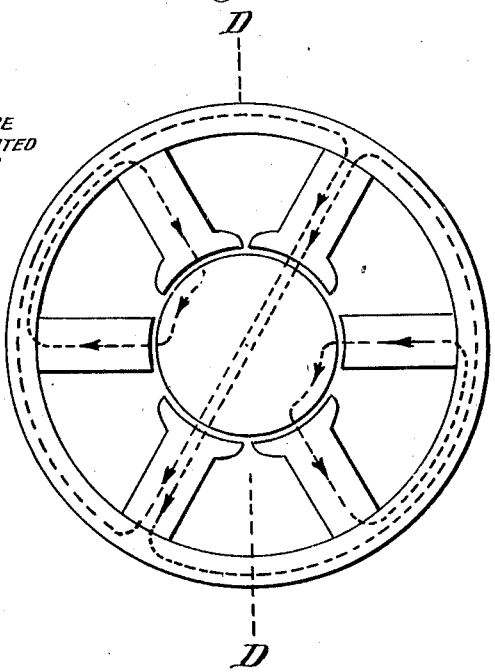
Fig. 3a,
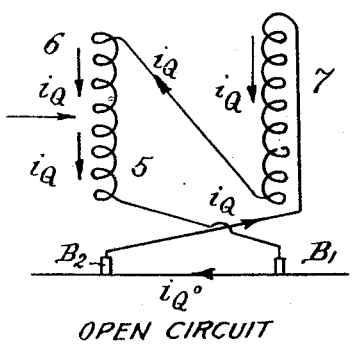
Fig. 4,
OPEN CIRCUIT
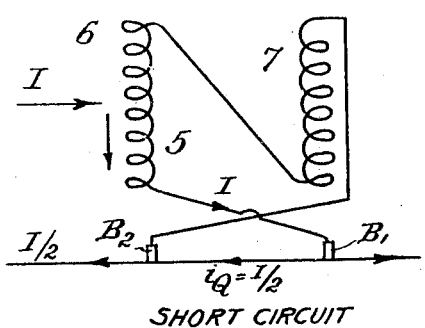
Fig. 5
SHORT CIRCUIT
INVENTOR
Joseph M. Tyrner
BY
ATTORNEYS Patented May 18, 1948

2,441,652

UNITED STATES PATENT OFFICE 2,441,652

WELDING GENERATOR

Joseph M. Tyrner, New York, N. Y., assignor to Air Reduction Company, Incorporated, a corporation of New York Application June 12, 1946, Serial No. 676,181

10 Claims. (Cl. 322—63)

This invention relates to direct current welding generators, a particular object of the invention being to provide a generator having armature and field circuits such that whenever the welding circuit is interrupted, the open circuit voltage will be suddenly increased to its normal value.

Welding generators embodying my invention may be wound for any desired number of poles, but in order to simplify the explanation of a typical embodiment of my invention, I shall refer principally to a generator having two main poles. The main poles of my improved generator may be regarded as bifurcated poles each having a leading shank and a trailing shank. These main poles are excited by current supplied from the armature of the generator, this armature current being generated by virtue of the armature inductors traversing a magnetic field produced by field poles in quadrature relation to the main field poles of the generator. These auxiliary field poles in quadrature relation to the main field poles have separately excited field windings and the magnitude of the current supplied to these windings on the exciter poles determines the magnitude of the current flowing in a portion of the generator armature winding which may be characterized as an exciter belt defined by the location of two sets of brushes engaging a commutator connected to the armature winding, the two pairs of brushes being arranged in quadrature relation to the main field poles. The leading and trailing shanks of each main field pole carry separate windings connected in series with each other, with their terminals connected to one of the pairs of brushes engaging the commutator. The welding circuit is supplied with current through connections at intermediate points on the windings located on the trailing shanks of the main field poles and this welding current may flow through one or more series compensation windings on the exciter poles in quadrature relation to the main field poles.

During the operation of the welding apparatus, it will be understood that the generator must be capable of operating under short circuit conditions at frequent intervals and that it must also provide a satisfactory open circuit voltage whenever the supply of current to the welding electrode and the work is interrupted, which also occurs at frequent intervals. The ordinary welding generator is not capable of providing the desired open circuit voltage instantaneously upon the welding circuit being interrupted and, as indicated above, the principal object of this invention is to provide a generator having an armature and field circuits so constructed and arranged that upon interrupting the welding circuit, the terminal voltage will be immediately increased to the desired value.

Another object of this invention is to provide improved control means for the generator whereby the generator load may be changed as desired by operating a potentiometer. This potentiometer may be located at a point remote from the generator if desired.

In my improved generator, the magnetic field created by the main field poles on open circuit is proportional to a current generated in a portion of the armature circuit traversed by a magnetic field in quadrature relation to the axis of the main field poles, this quadrature field being proportional to the ampere turns of the exciter windings supplied with excitation current from a separate source of excitation, the magnitude and direction of this excitation current being under the control of the operator. A preferred embodiment of my invention also comprises an automatic control relay responsive to the difference of potential between the separate source of excitation for the generator and the generated voltage.

Various objects and advantages of my invention will be more apparent upon considering the following detailed description of a typical embodiment of my invention illustrated in the accompanying drawings, in which:

Fig. 3 is a diagrammatic illustration of portions of the generator illustrated in Fig. 1 showing the magnetic circuits during short circuit operation;

Fig. 3a is a diagrammatic illustration of portions of the generator illustrated in Fig. 1 showing the magnetic circuits on open circuit;

Fig. 4 is a simplified circuit diagram showing typical armature and field circuit conditions obtaining during open circuit operation; and Fig. 5 is a simplified circuit diagram similar to Fig. 4 but illustrating the conditions obtaining during short circuit operation.

Figure 1:
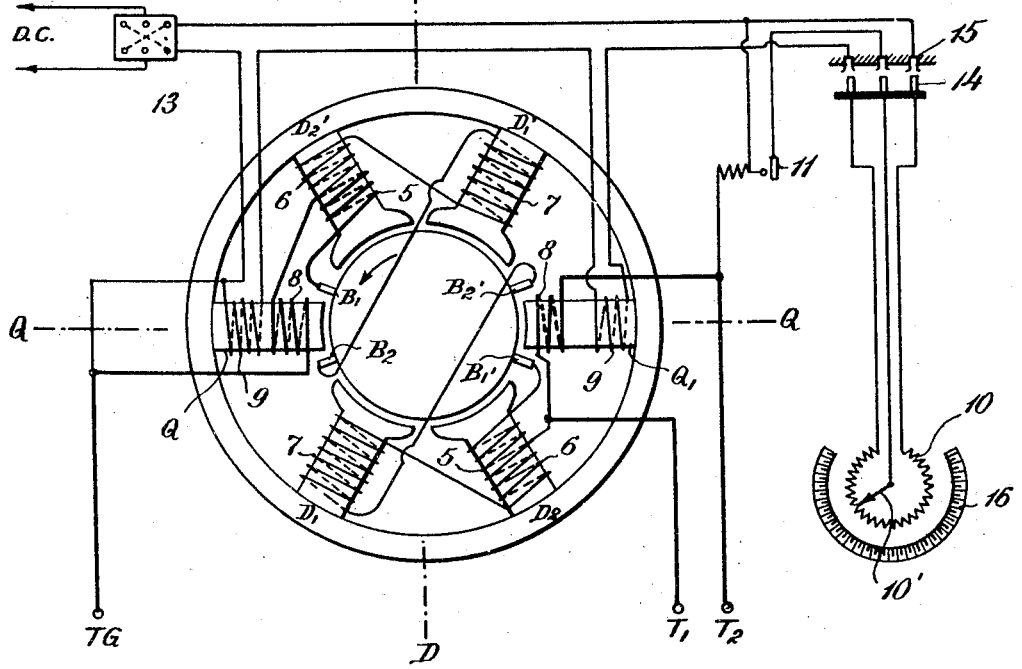
Fig. 1 is a diagrammatic illustration of one form of my improved welding generator together with control apparatus for controlling the generator load.

In the illustrative embodiment of my invention illustrated in the accompanying drawings, I have shown a direct current welding generator having two main field poles having an axis D—D, each pole being a bifurcated pole having a leading shank and a trailing shank. The leading pole shanks are shown at $D_1$ and $D_{1'}$ and the trailing shanks at $D_2$ and $D_{2'}$. Exciter poles Q and $Q_1$ are located in quadrature relation to the main poles, the axis of these exciter poles being shown at Q—Q. Instead of providing a single pair of brushes in quadrature relation to the main field poles, I have provided two pairs of brushes $B_1$, $B_2$ and $B_{1'}$ and $B_{2'}$, the brushes of each pair being separated as illustrated so as to provide what may be characterized as an exciter belt in the armature winding, in quadrature relation to the main field poles.

The exciter poles Q and $Q_1$ are provided with field windings 9 connected to a separate source of excitation through a reversing switch 13 which determines the direction of the current supplied to these exciter windings. In the field circuit of the generator I have illustrated a variable resistance 10 connected in series with the exciter pole windings 9. An adjustable contact 10' associated with resistance 10 is connected to the armature of a relay 11, the arrangement being such that, whenever the relay contacts are closed, a portion of the resistance 10 is short circuited, whereby full voltage is supplied to the windings 9 on the exciter poles Q and $Q_1$ of the generator.

The leading and trailing shanks of each main field pole are provided with series connected windings shown at 5, 6 and 7, these windings for the shanks $D_{1'}$ and $D_{2'}$ being connected to the brushes $B_2$ and $B_1$, respectively, and the corresponding windings on shanks $D_1$ and $D_2$ being connected to the brushes $B_{2'}$ and $B_{1'}$, respectively. The main terminals for the welding circuit are shown at $T_8$ and $T_2$ and the current supplied by the generator to these terminals is supplied through connections at intermediate points on the windings 5 and 6 on the trailing pole shanks $D_2$ and $D_{2'}$, this load current flowing through series compensation windings 8 mounted on the exciter poles Q and $Q_1$.

The operating coil of the control relay 11 is connected between a terminal of the welding circuit and a terminal of the separate source of excitation, the arrangement being such that the relay 11 is responsive to the difference in potential between the source of excitation current and the generated voltage. The contacts of the relays 11 are normally open because during normal operation the generated voltage is equal and opposite to the potential of the separate source of excitation. Under these conditions, the entire resistance of the potentiometer 10 is connected in series with the windings 9, but whenever the terminal voltage of the generator decreases, the relay 11 closes to short circuit a portion of the potentiometer 10, thereby increasing the supply of excitation current to the exciter windings 9.

An auxiliary welding circuit terminal $T_1$ is provided, this terminal being connected between the winding 5 on the trailing pole shank $D_2$ and the series compensation winding 8 on the exciter pole $Q_1$ and it will be understood that the welding circuit may be connected to either terminal $T_1$ or $T_2$ as desired.

Figure 2:
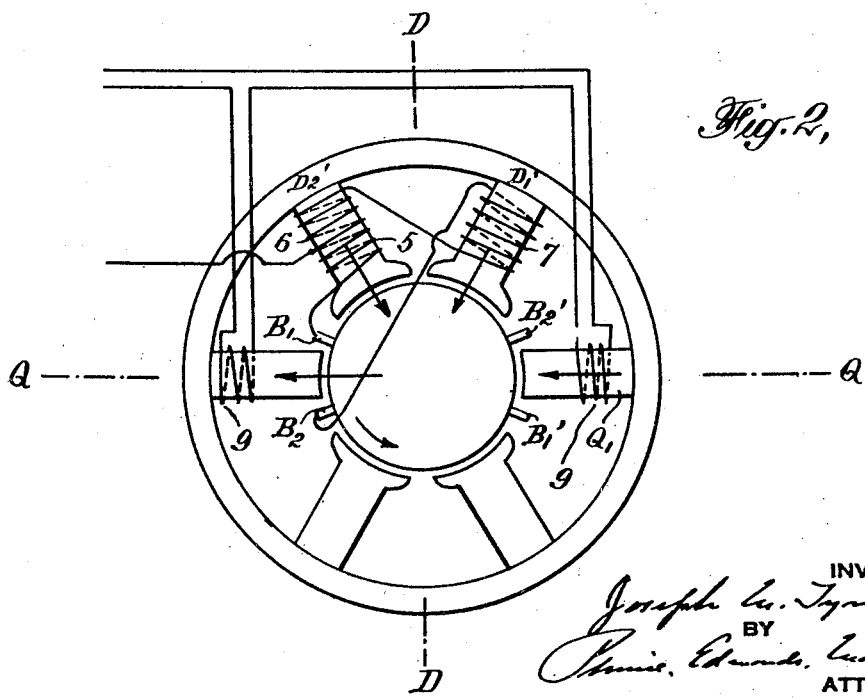
Fig. 2 is a diagrammatic illustration of a portion of the generator illustrated in Fig. 2 showing open circuit conditions in a portion of the generator field structure and in a portion of the armature.

In the simplified exciter circuit illustrated in Fig. 2, I have shown only one pair of brushes and one main pole connected to form a closed circuit. The arrows in alinement with the poles illustrated in Fig. 2 indicate the magnetic field conditions obtaining on open circuit, at which time current does not flow in the external load circuit of the generator. Under these conditions, the magnetizing current supplied to the exciter windings 9 from the separate source of excitation produces a magnetic field whereby an E. M. F. is generated between brushes $B_1$ and $B_2$ and a corresponding E. M. F. is generated between brushes $B_{1'}$ and $B_{2'}$. The exciter belt of the armature forms a closed circuit with the windings 5, 6 and 7 and the current supplied to these windings by brushes $B_1$ and $B_2$ produces a magnetic field in the direction D—D.

These conditions obtaining during open circuit operation are illustrated in Fig. 4 in which it is apparent that the brushes $B_1$ and $B_2$ supply current from the exciter belt (represented by the straight line between these brushes) to the windings 7, 6 and 5 on the leading and trailing shanks, respectively, of one of the main field poles. Thus, the current from the exciter belt of the armature winding serves to augment the excitation produced by the exciter windings 9 to produce a maximum terminal voltage on open circuit and it will be understood that the magnitude of this voltage depends primarily on the magnitude of the current supplied to the windings 9 on the exciter poles because the magnetic field produced by these poles determines the magnitude of the current generated in the exciter belt of the armature.

As illustrated in Figs. 2 and 4, the windings 5, 6 and 7 are connected in series between the brushes $B_1$ and $B_2$. When the welding circuit is open, current flows substantially only in that portion of the armature winding which constitutes the exciter belt. This current $iQ_0$ flows in the closed circuit including the exciter belt and the windings 5, 6 and 7 as best illustrated in Fig. 4, the direction of current flows through these windings being such as to produce magnetic poles of like polarity.

During short circuit operation, the load current I flows through the windings 5 to produce a condition best illustrated in Figs. 3 and 5. The impedance of the winding 5 is less than that of the windings 6 and 7 connected in series with each other, and accordingly on short circuit substantially all of the short circuit current flows through the winding 5 and the current flowing through windings 6 and 7 is negligible.

The short circuit current I flowing through the winding 5 produces a magnetic field represented by the dotted lines $F_1$ and $F_2$ in Fig. 3. The magnetic flux represented by the line $F_1$ does not enter the armature and the magnetic flux represented by the line $F_2$ enters and leaves the armature under the same main field pole and therefore does not generate any voltage in the armature. The magnetic flux represented by the line $F_3$ in Fig. 3 represents the armature field excited by the exciter belt and during short circuit conditions this is the only magnetic field traversing the armature winding in a manner to generate the terminal voltage which causes the short circuit current to flow. Thus, the predominant source of excitation for the short circuit current is the exciter belt of the armature and the magnitude of the short circuit current is limited accordingly. This short circuit current is proportional to the total number of ampere turns in the quadrature axis Q—Q.

It will be understood that for operating conditions between short circuit and open circuit, some current may flow through the windings 6 and 7. If the load current is automatically interrupted, the currents in winding 5 and in the exciter belt must then flow through coils 6 and 7 in the direction which tends to produce maximum open circuit voltage. The windings 5 and 6 on the same pole $D_{2'}$ act like an autotransformer counteracting any E. M. F. induced in winding 7 which would tend to oppose the flow of current $i_q$ through the windings 7 and 6 and accordingly the desired change in the magnetic circuit to produce maximum open circuit voltage occurs very rapidly.

Inasmuch as the magnitude of the short circuit current is proportional to the excitation of the exciter poles $QQ_1$, it is apparent that the output of the generator may be increased by increasing this excitation, e. g., by short circuiting a portion of the resistance 10 as described above. The series excitation in the Q—Q axis, produced by current flowing in the coils 8 is, of course, zero for open circuit operation and accordingly does not affect the open circuit voltage. On short circuit, however, this series excitation adds considerably to the magnetic flux of the quadrature field. In Fig. 3, the arrow $H_4$ indicates the armature field excited by the load current, this field being in opposition to the magnetic field $H_5$ which excites that portion of the armature winding constituting the exciter belt.

The contact 10' of the potentiometer may be adjusted as desired to control the amount of resistance in series with the exciter windings 9, the potentiometer dial 16 being calibrated in amperes at an average arc voltage. By providing a three prong plug 14 and receptacle 15, it is possible to use the potentiometer for remote control as best indicated in Fig. 1.

An adjustable part of the resistance 10 is short circuited under load, thus increasing the excitation current. This short circuiting is done by relay 11. Under load conditions there is no danger of sparking.

The transition from open circuit to short circuit condition, and vice versa, is illustrated in Figs. 3 and 3a. These two figures show that only the field in poles $D_1$ and $D_{1'}$ change their direction. The change of direction is produced by auto transformer action on poles $D_2$ and $D_{2'}$.

It will be understood that my invention is not limited to the particular embodiment thereof illustrated in the accompanying drawings but includes such modifications thereof as fall within the scope of the appended claims.

I claim:

1. A generator comprising an armature, a pair of bifurcated poles each having a leading shank and a trailing shank, a pair of exciter poles in quadrature relation to said bifurcated poles, two pairs of brushes forming an exciter belt in said armature in quadrature relation to said pair of bifurcated poles, separate windings on the shanks of one bifurcated pole, connected in series with one of said pairs of brushes, and separate windings on the shanks of the other bifurcated pole connected in series with the other pair of brushes; load circuit connections at intermediate points of the windings on the trailing shanks of the bifurcated poles; and means for supplying excitation current for said exciter poles.

2. A generator comprising an armature, a pair of bifurcated poles each having a leading shank and a trailing shank, a pair of exciter poles in quadrature relation to said bifurcated poles, two pairs of brushes forming an exciter belt in said armature in quadrature relation to said pair of bifurcated poles, separate windings on the shanks of one bifurcated pole, connected in series with one of said pairs of brushes, and separate windings on the shanks of the other bifurcated pole connected in series with the other pair of brushes; a load circuit connected at an intermediate point of each of the windings on the trailing shanks of the bifurcated poles; and a separate source of excitation for supplying excitation current for said exciter poles.

3. Welding apparatus comprising a generator armature, a pair of bifurcated poles each having a leading shank and a trailing shank, a pair of exciter poles in quadrature relation to said bifurcated poles, two pairs of brushes associated with said armature to form an exciter belt in said armature in quadrature relation to said pair of bifurcated poles, at least two separate windings, one on each shank of one of said bifurcated poles, the said separate windings being connected in series with one of said pairs of brushes, and separate windings one on each shank of the other bifurcated pole and connected in series with the other pair of brushes; load circuit connections at intermediate points of the said windings on the trailing shanks of the bifurcated poles; means for supplying excitation current for said exciter poles; and a series compensation winding on at least one of said exciter poles and connected in the load circuit.

4. Welding apparatus comprising a generator armature, a pair of bifurcated poles each having a leading shank and a trailing shank, a pair of exciter poles in quadrature relation to said bifurcated poles, two pairs of brushes associated with said armature to form an exciter belt in said armature in quadrature relation to said pair of bifurcated poles, at least two separate windings, one on each shank of one said bifurcated poles, the said separate windings being connected in series with one of said pairs of brushes, and separate windings one on each shank of the other bifurcated pole and connected in series with the other pair of brushes; load circuit connections at intermediate points of the said winding on the trailing shanks of the bifurcated poles; means for supplying excitation current for said exciter poles, a series compensation winding on each of said exciter poles, and means for bypassing the load current around one of said compensation windings.

5. Welding apparatus comprising a generator armature, a pair of bifurcated poles each having a leading shank and a trailing shank, a pair of exciter poles in quadrature relation to said bifurcated poles, two pairs of brushes associated with said armature to form an exciter belt in said armature in quadrature relation to said pair of bifurcated poles, separate windings on the shanks of one bifurcated pole, connected in series with one of said pairs of brushes, and separate windings on the shanks of the other bifurcated pole connected in series with the other pair of brushes; load circuit connections at intermediate points of the windings on the trailing shanks of the bifurcated poles, means for supplying excitation current for said exciter poles; and control means responsive to the difference in value between the voltage of the excitation current supplying means and a voltage generated in the generator, for changing the amount of current supplied to said exciter poles.

6. Welding apparatus comprising a generator armature, a pair of bifurcated poles each having a leading shank and a trailing shank, a pair of exciter poles in quadrature relation to said bifurcated poles, two pairs of brushes associated with said armature to form an exciter belt in said armature in quadrature relation to said pair of bifurcated poles, separate windings on the shanks of one bifurcated pole, connected in series with one of said pairs of brushes, and separate windings on the shanks of the other bifurcated pole connected in series with the other pair of brushes; load circuit connections at intermediate points of the windings on the trailing shanks of the bifurcated poles, means for supplying excitation current for said exciter poles; and control means responsive to the difference in value between the voltage of the excitation current supplying means and a voltage generated in the generator, for changing the amount of current supplied to said exciter poles, said control means comprising a relay having its coil connected between the source of excitation current and the generator whereby the relay responds when there is a drop in terminal voltage of the generator.

7. Welding apparatus comprising a generator armature, a pair of bifurcated poles each having a leading shank and a trailing shank, a pair of exciter poles in quadrature relation to said bifurcated poles, two pairs of brushes associated with said armature to form an exciter belt in said armature in quadrature relation to said pair of bifurcated poles, separate windings on the shanks of one bifurcated pole, connected in series with one of said pairs of brushes, and separate windings on the shanks of the other bifurcated pole connected in series with the other pair of brushes; load circuit connections at intermediate points of the windings on the trailing shanks of the bifurcated poles, means for supplying excitation current for said exciter poles; and control means responsive to the difference in value between the voltage of the excitation current supplying means and a voltage generated in the generator, for changing the amount of current supplied to said exciter poles, said control means comprising a relay having its coil connected between the source of excitation current and the generator whereby the relay responds when there is a drop in terminal voltage of the generator; and a potentiometer connected across the source of excitation current and to said relay whereby operation of the relay short-circuits a portion of the potentiometer.

8. Welding apparatus comprising a generator having an armature, a pair of bifurcated poles each having a leading shank and a trailing shank, a pair of exciter poles in quadrature relation to said bifurcated poles, two pairs of brushes associated with said armature to form therein an exciter belt in quadrature relation to said pair of bifurcated poles, at least two separate windings one on each shank of one of said bifurcated poles and connected in series with one of said pairs of brushes, and at least two separate windings one on each shank of the other bifurcated pole and connected in series with the other pair of brushes; load circuit connections at intermediate points of the windings on the trailing shanks of the bifurcated poles, a separate source of excitation for supplying excitation current for said exciter poles; and manually adjustable means connected across said source of excitation current whereby the volume of current supplied to said exciter poles can be manually adjusted.

9. Welding apparatus comprising a generator armature, a pair of bifurcated poles each having a leading shank and a trailing shank, a pair of exciter poles in quadrature relation to said bifurcated poles, two pairs of brushes associated with said armature to form an exciter belt in said armature in quadrature relation to said pair of bifurcated poles, separate windings on the shanks of one bifurcated pole, connected in series with one of said pairs of brushes and separate windings on the shanks of the other bifurcated pole connected in series with the other pair of brushes; load circuit connections at intermediate points of the windings on the trailing shanks of the bifurcated poles, means for supplying excitation current for said exciter poles; and control means responsive to the difference in value between the voltage of the excitation current supplying means and a voltage generated in the generator, for changing the amount of current supplied to said exciter poles, said control means comprising a relay having its coil connected between the source of excitation current and the generator whereby the relay responds when there is a drop in terminal voltage of the generator; and a potentiometer connected across the source of excitation current and to said relay whereby operation of the relay short-circuits a portion of the potentiometer, the said potentiometer being manually adjustable whereby the volume of current supplied to said exciter poles can be manually adjusted.

10. A generator comprising an armature, a pair of bifurcated poles each having a leading shank and a trailing shank, a pair of exciter poles in quadrature relation to said bifurcated poles, two pairs of brushes forming an exciter belt in said armature in quadrature relation to said pair of bifurcated poles with the two pairs of brushes in electrical connection with points in said armature at opposite sides of the exciter belt, separate windings on the shanks of one bifurcated pole, connected in series with one of said pairs of brushes whereby the exciter belt in the armature and the said series connected windings and brushes form a closed circuit, and separate windings on the shanks of the other bifurcated pole connected in series with the other pair of brushes to form a second closed circuit including the exciter belt in the armature.

JOSEPH M. TYRNER.